US006940201B2

(12) United States Patent
Umeda

(10) Patent No.: US 6,940,201 B2
(45) Date of Patent: Sep. 6, 2005

(54) ROTARY ELECTRIC MACHINE HAVING PARTIALLY Δ-CONNECTED STATOR WINDING

(75) Inventor: Atsushi Umeda, Okazaki (JP)

(73) Assignee: Denso Corporation, Kariya (JP)

( * ) Notice: Subject to any disclaimer, the term of this patent is extended or adjusted under 35 U.S.C. 154(b) by 97 days.

(21) Appl. No.: 10/076,269

(22) Filed: Feb. 19, 2002

(65) Prior Publication Data

US 2002/0135257 A1 Sep. 26, 2002

(30) Foreign Application Priority Data

Mar. 23, 2001 (JP) ....................................... 2001-084685

(51) Int. Cl.[7] ................................................ H02K 11/00
(52) U.S. Cl. ........................ 310/184; 310/198; 310/179
(58) Field of Search ................................ 310/179, 184, 310/198, 201, 208, 180, 186, 196; 29/596–598

(56) References Cited

U.S. PATENT DOCUMENTS 4,268,788 A * 5/1981 Takeda et al. ................ 322/59
4,710,661 A * 12/1987 Gjota ......................... 310/198
5,122,705 A * 6/1992 Kusase et al. ............ 310/68 D
5,270,602 A * 12/1993 Takehara .................... 310/198
5,449,962 A * 9/1995 Shichijyo et al. ........... 310/184
5,955,810 A 9/1999 Umeda et al. .............. 310/208
5,998,903 A 12/1999 Umeda et al. .............. 310/179
6,137,201 A * 10/2000 Umeda et al. .............. 310/179
6,140,735 A * 10/2000 Kato et al. .................. 310/201
6,455,974 B1 * 9/2002 Fogarty ...................... 310/196
6,498,414 B2 * 12/2002 Asao .......................... 310/184

FOREIGN PATENT DOCUMENTS

| | | |
|---|---|---|
| DE | 416 662 | 7/1925 |
| DE | 32 02 958 A1 | 8/1983 |
| EP | 0 018 835 A1 | 11/1980 |
| EP | 0 534 153 A1 | 8/1992 |
| EP | 0 828 335 A1 | 3/1998 |
| JP | 56-125955 A | 10/1981 |
| JP | B-148045 | 3/2000 |
| JP | 2000-69729 | 3/2000 |

* cited by examiner

*Primary Examiner*—Darren Schuberg
*Assistant Examiner*—Leda Pham
(74) *Attorney, Agent, or Firm*—Oliff & Berridge, PLC

(57) ABSTRACT

A vehicular alternator has a stator winding, in which a middle point of one phase winding is connected to a winding finish end of another phase winding in a cyclic manner among the three-phase windings. A Δ-connection portion is formed by a portion between the middle points and the winding finish ends of the respective phase windings and a Y-connection portion is formed by a portion other than the Δ-connection portion. The output characteristic of the vehicular alternator is variable depending on a position of the middle point.

11 Claims, 8 Drawing Sheets

ROTARY ELECTRIC MACHINE HAVING PARTIALLY Δ-CONNECTED STATOR WINDING

CROSS REFERENCE TO RELATED APPLICATION

This application is based on and incorporates herein by reference Japanese Patent Application No. 2001-84685 filed on Mar. 23, 2001.

FIELD OF THE INVENTION

The present invention relates to a rotary electric machine such as an alternator mounted in a passenger vehicle, a truck or the like.

BACKGROUND OF THE INVENTION

A vehicular alternator (alternating current generator) is required to be small-sized and capable of supplying required power in low-speed rotations or high-speed rotations. The number of turns of a stator winding of a vehicular alternator is changed to meet such needs. However, when only the number of turns (T) of the stator windings is changed in a conventional vehicular alternator 1 having a Y-connected stator winding 23 and a rectifier device 5 as shown in FIG. 12, the output characteristics of the alternator changes as shown in FIG. 13. In FIG. 13, respective characteristic curves A, B and C show the output characteristic of the vehicular alternator when the number of turns (T) of the stator winding 23 is set to 3, 4 and 5. As the number of turns is changed from one integer number of turns to another integer number of turns, the output characteristic is stepwisely changed. Therefore, a desired output characteristic cannot be achieved.

SUMMARY OF THE INVENTION

It is therefore an object of the present invention to provide a rotary electric machine capable of changing its output characteristics more smoothly.

According to the present invention, a rotary electric machine has a multi-phase winding comprising a plurality of phase windings wound in a plurality of slots of a stator core at predetermined intervals. The multi-phase winding is formed by cyclically connecting one end of one phase winding to a middle point other than both ends of another phase winding. Thus, the phase windings form both the Δ-connection and the Y-connection in the stator winding arrangement. The windings connected in Δ-connection are substantially equivalent to windings connected in Y-connection having a number of turns multiplied by $1/\sqrt{3}$. Therefore, the number of turns of the multi-phase winding in conversion with that of Y-connection is equivalent to the number of turns of Y-connection portion added with a number of turns produced by multiplying a number of turns of the Δ-connection portion by $1/\sqrt{3}$. Therefore, by only changing a position of the middle point connected with two of the phase windings, a ratio of number of turns of the Y-connection portion to the Δ-connection portion can be changed at small intervals.

Particularly, in changing the ratio, only the position of the middle point constituting the portion of connecting two of the phase windings is changed. Therefore, it is not necessary to considerably change a manufacturing facility and the cost can be reduced in accordance with simplification of the manufacturing facility.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

Figure 1:
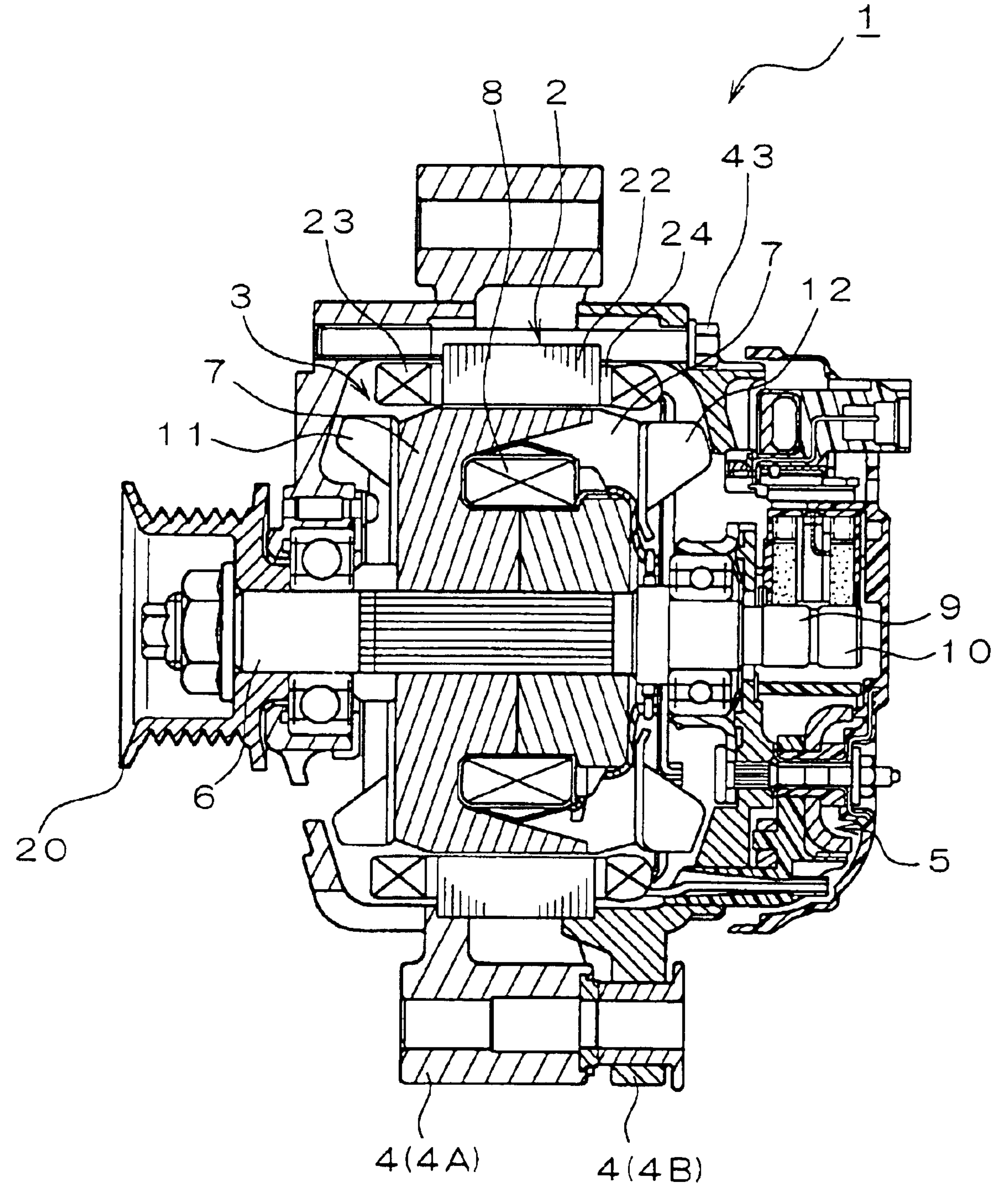
FIG. 1 is a sectional view showing an embodiment of a vehicular alternator according to the present invention.

Referring first to FIG. 1, a vehicular alternator 1 includes a stator 2, a rotor 3, a frame 4, a rectifier device 5 and the like.

The stator 2 includes a stator core 22, a stator winding 23 mounted on the stator core 22, and an insulator 24 for electrically insulating the stator core 22 from the stator winding 23. The stator core 22 is constituted by stacking thin steel plates and formed with a plurality of slots on a peripheral side of a shape of a circular ring.

The rotor 3 is rotatable integrally with a shaft 6 and includes a Lundell-type pole core 7, a field winding 8, slip rings 9 and 10, a mixed flow fan 11 and a centrifugal fan 12 for cooling and the like. The shaft 6 is connected to a pulley 20 and is driven to rotate by an engine (not illustrated) mounted to a vehicle.

The frame 4 contains the stator 2 and the rotor 3, supports the rotor 3 in a rotatable state about the shaft 6 and is fixed with the stator 2 arranged on an outer peripheral side of the pole core 7 of the rotor 3 with a predetermined clearance therebetween. The frame 4 comprises a front frame 4A and a rear frame 4B, which are fastened by a plurality of fastening bolts 43 to thereby support the stator 2 and the like.

The rectifier device 5 is connected with lead wires extended from the stator windings 23 for subjecting three-phase alternating current voltages applied from the stator windings 23 to three-phase full-wave rectification to convert into direct current voltage.

According to the vehicular alternator 1 having the above structure, when rotational force is transmitted from the engine (not illustrated) to the pulley 20 via a belt or the like, the rotor 3 is rotated in a predetermined direction. By applying excitation voltage from outside to the field winding 8 of the rotor 3 under the state, the respective claw-like magnetic pole portions of the pole core 7 are excited, three-phase alternating current voltages can be generated at the stator windings 23 and predetermined direct current power is outputted from an output terminal of the rectifier device 5.

The vehicular alternator 1 is wound with three-phase windings comprising three of phase windings of full-pitch winding having phase differences of 120° in electric angle thereamong as the stator winding 23. For example, the number of the magnetic poles is 16, and in correspondence therewith the number of slots 25 (FIGS. 4 and 5) of the stator 2 is set to 48.

Figure 3:
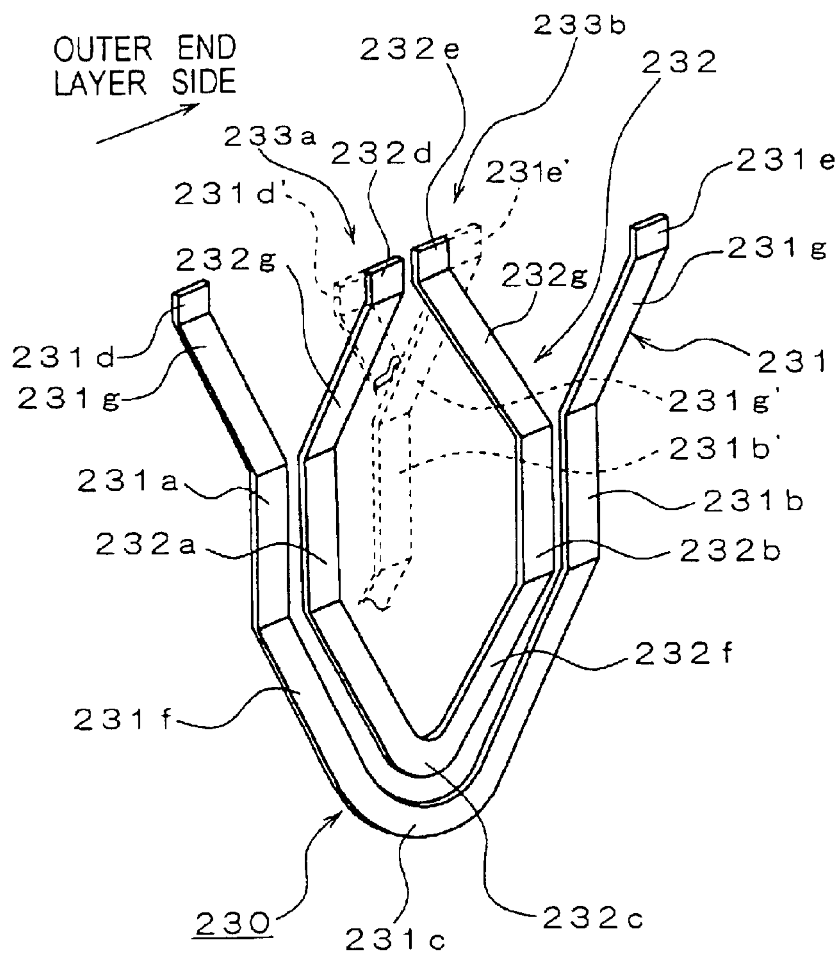
FIG. 3 is a perspective view showing conductor segments of the stator winding in the embodiment.
Figure 4:
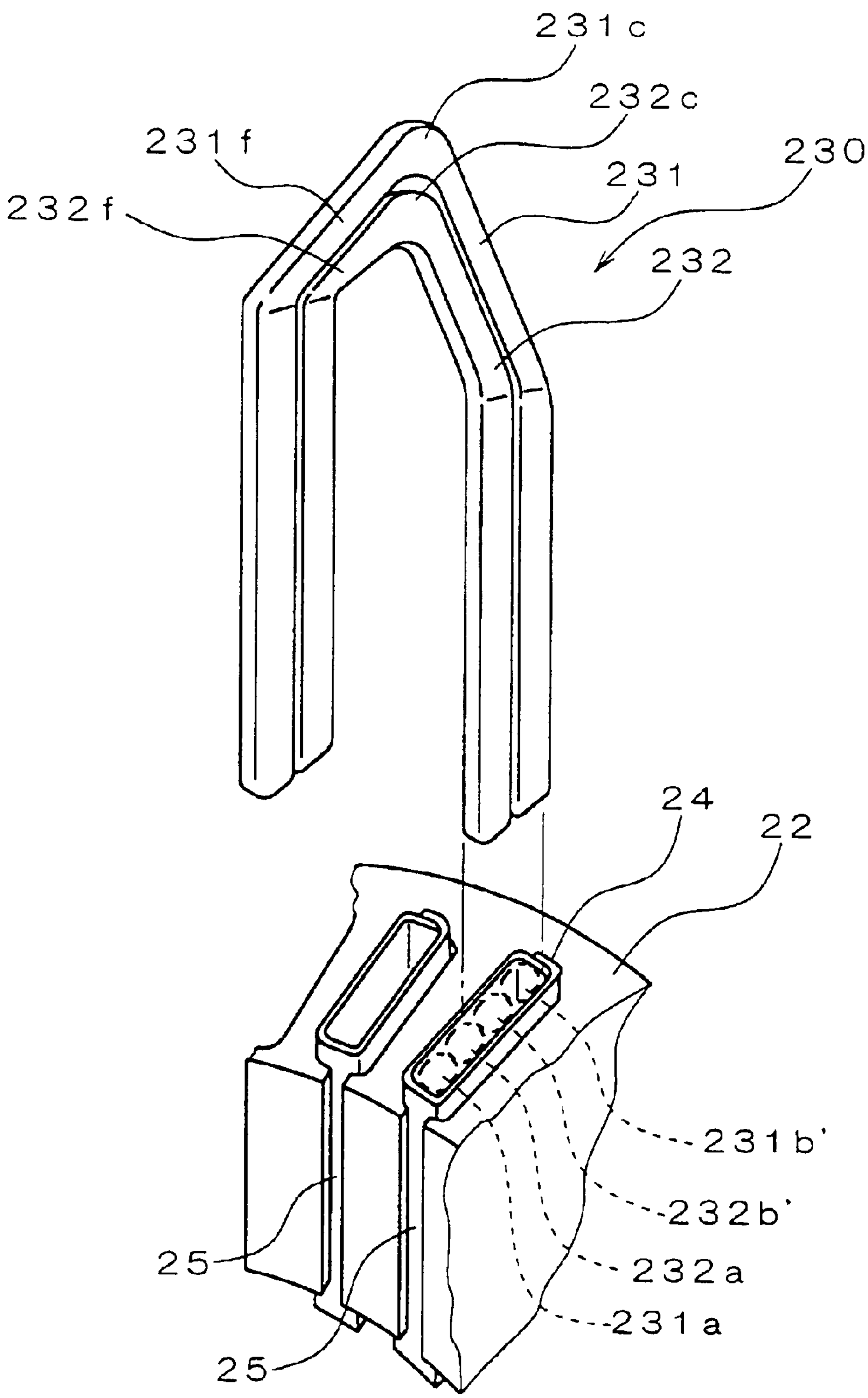
FIG. 4 is a perspective view showing a state of integrating the conductor segments in the embodiment.
Figure 5:
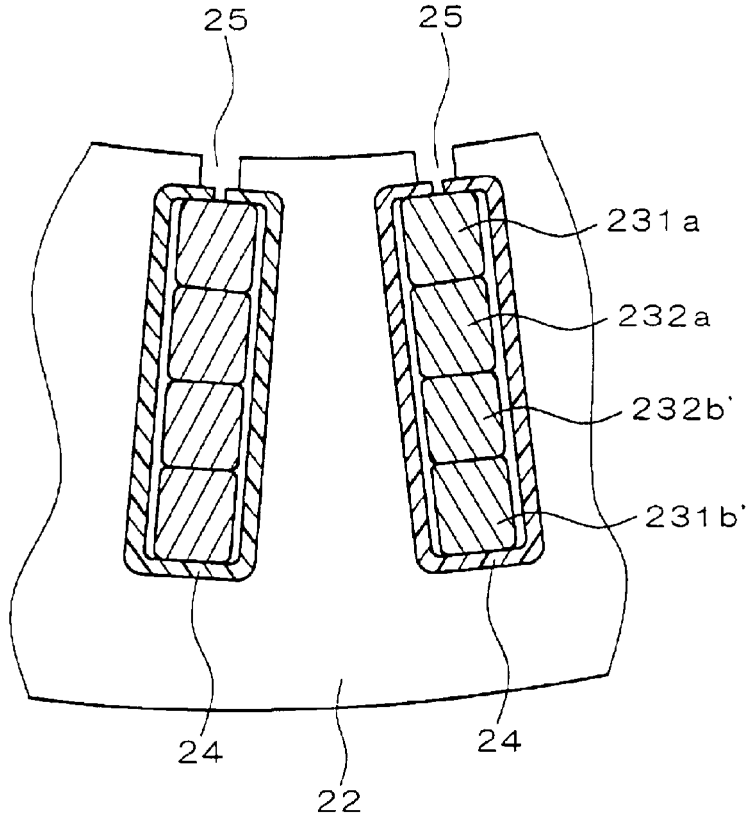
FIG. 5 is a partial sectional view showing a stator in the embodiment.

The number of turns of each of the three-phase windings are equal to one another, and each of the slots 25 of the stator core 22 contains an equal number of winding conductors (FIGS. 3 and 4). For example, according to the embodiment, 4 pieces of electric conductors are contained in the respective slot 25. Generally, "number of turns" is defined as the number of conductors connected in series per pole. However, practically, the rotary machine characteristics, that is defined by adding together in series by a number of poles, are determined by a total number of the conductors. Therefore, the number of series-connected conductors (pole number×number of turns) is used in the following description. In the case of 16 poles and a number of turns per slot of 4, the series conductor number becomes 64.

Figure 2:
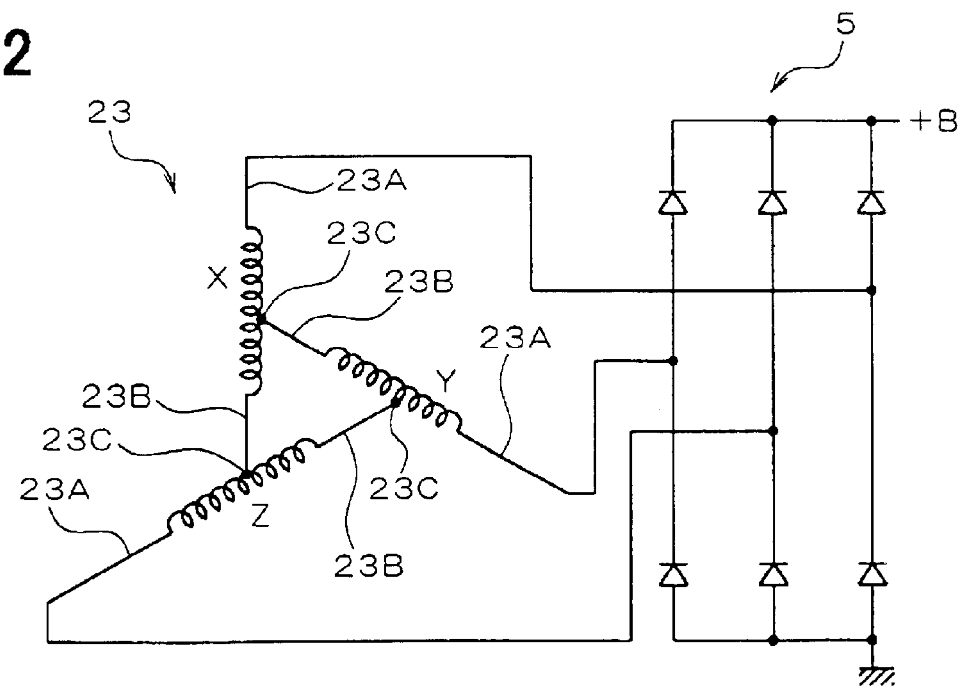
FIG. 2 is a wiring diagram showing connection of a stator winding and a rectifier device in the embodiment.

As shown in FIG. 2, the respective phase winding is provided with a middle point 23C, which is not necessarily a half-way point but may be any point other than a winding start end 23A and a winding finish end 23B. The middle point 23C of the respective phase winding is connected to the winding start end 23A or the winding finish end 23B of other phase winding. According to the embodiment, when respective phases of the three-phase windings are defined as X-phase, Y-phase and Z-phase, the middle point 23C of the phase winding of X-phase and the winding finish end 23B of the phase winding of Y-phase are connected. Similarly, the middle point 23C of the phase winding of Y-phase and the winding finish end 23B of the phase winding of Z-phase are connected. The middle point 23C of the phase winding of Z-phase and the winding finish end 23B of the phase winding of X-phase are connected. That is, the middle point of each phase winding is connected to the winding finish end of another phase winding cyclically, in the clockwise direction in FIG. 2.

Further, according to the respective phase winding, the position of the middle point 23C is set such that in the series conductor number "64", "48" is constituted by from the winding start end 23A to the middle point 23C and "16" is constituted by from the middle point 23C to the winding finish end 23B. After the above connection has been carried out, lead wires extended from the winding start ends 23A of the respective phase windings are connected to the rectifier device 5.

The stator winding 23 is constructed as shown in FIG. 3 and arranged in the stator 22 as shown in FIGS. 4–7.

The stator winding 23 mounted in the slot 25 of the stator core 22 is constituted by a plurality of electric conductors and the respective slot 25 contains an even number (4 pieces according to the embodiment) of electric conductors. Further, 4 electric conductors in the single slot 25 are aligned in one row in an order of an inner end layer, an inner middle layer, an outer middle layer and an outer end layer from an inner side with respect to a diameter direction of the stator core 22 as shown in FIG. 3 and FIG. 4.

An electric conductor 231*a* of an inner end layer at inside of one slot 25 is paired with an electric conductor 231*b* of an outer end layer at inside of other slot 25 of the stator core 22 remote from the electric conductor 231*a* by one magnetic pole pitch (3 slots) in the clockwise direction. Similarly, an electric conductor 232*a* of an inner middle layer at inside of one slot 25 is paired with an electric conductor 232*b* of an outer middle layer at inside of other slot 25 of the stator core 22 remote from the electric conductor 232*a* by one magnetic pole pitch in the clockwise direction. Further, the paired electric conductors are connected by using continuous lines on one end face side in an axial direction of the stator core 22 by way of turn portions 231*c* and 232*c*.

Figure 7:
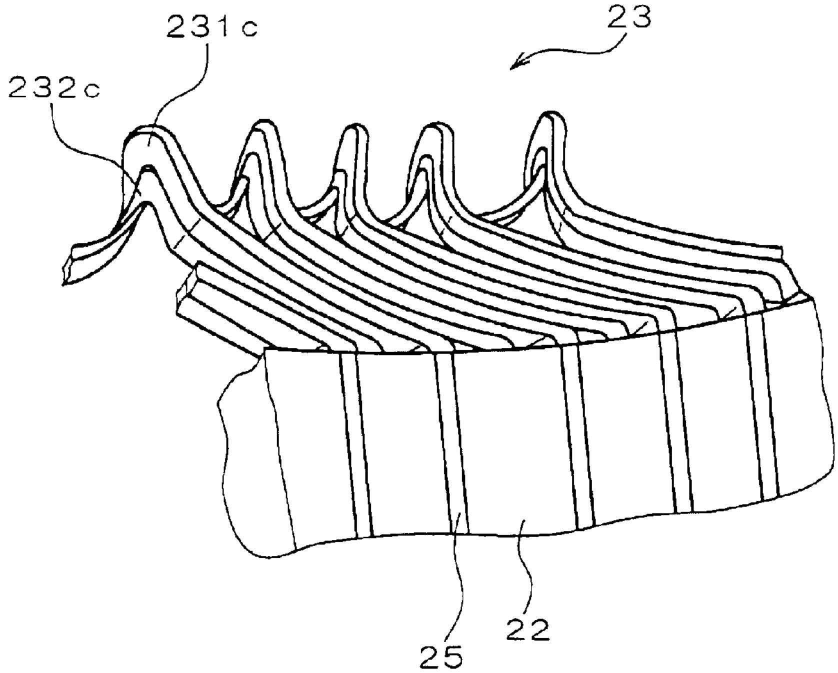
FIG. 7 is a partial perspective view showing the stator in the embodiment.

Therefore, on the one end face side of the stator core 22, as shown in FIG. 7, the continuous line for connecting the electric conductor 231*b* of the outer end layer and the electric conductor 231*a* of the inner end layer by way of the turn portion 231*c*, incorporates the continuous line connecting the electric conductor 232*b* of the outer middle layer and the electric conductor 232*a* of the inner middle layer by way of the turn portion 232*c*. In this way, on the one axial end side of the stator core 22, the turn portion 232*c* as a connecting portion of the paired electric conductors is surrounded by the turn portion 231*c* as a connecting portion of the other paired electric conductors contained at inside of the same slot 25. By connecting the electric conductor 232*b* of the outer middle layer and the electric conductor 232*a* of the inner middle layer, a middle layer coil end is formed. By connecting the electric conductor 231*b* of the outer end layer and the electric conductor 231*a* of the inner end layer, an end layer coil end is formed.

Meanwhile, the electric conductor 232*a* of the inner middle layer at inside of one slot 25 is also paired with an electric conductor 231*a'* of an inner end layer at inside of other slot 25 of the stator core 22 remote from the electric conductor 232*a* by one magnetic pole pitch in the clockwise direction. Similarly, an electric conductor 231*b'* of an outer end layer at inside of one slot 25 is also paired with the electric conductor 232*b* of the outer middle layer at inside of other slot 25 of the stator core 22 remote from the electric conductor 231*b'* by one magnetic pole pitch in the clockwise direction. Further, these electric conductors are connected on other end face side in the axial direction of the stator core 22.

Figure 6:
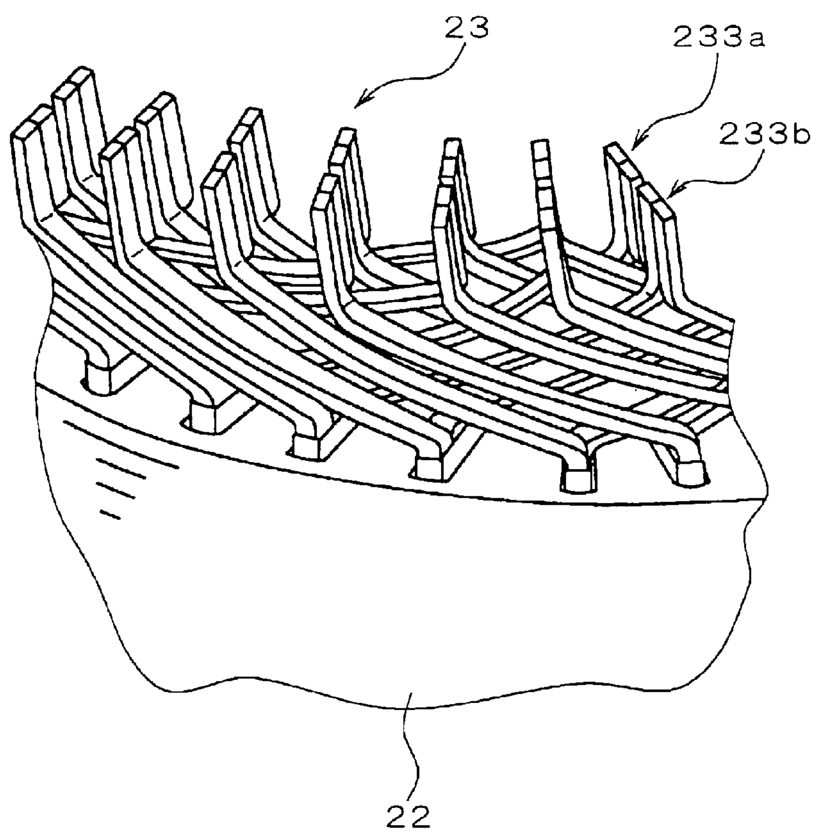
FIG. 6 is a partial perspective view showing the stator shown in the embodiment.

Therefore, on the other axial end face side of the stator core 22, as shown in FIG. 6, there are arranged an outer side joint portion 233*b* for connecting the electric conductor 231*b'* of the outer end layer and the electric conductor 232*b* of the outer middle layer, and an inner side joint portion 233*a* for connecting the electric conductor 231*a'* of the inner end layer and the electric conductor 232*a* of the inner middle layer in a state of being shifted from each other in a diameter direction and a peripheral direction. By connecting the electric conductor 231*b'* of the outer end layer and the electric conductor 232*b* of the outer middle layer and connecting the electric conductor 231*a'* of the inner end layer and the electric conductor 232*a* of the inner middle layer, there are formed two continuous layer coil ends arranged on different concentric circles.

Further, as shown in FIG. 3, the electric conductor 231*a* of the inner end layer and the electric conductor 231*b* of the outer end layer are provided by a large segment 231 constituted by forming a series of the electric conductors substantially in a U-like shape. Further, the electric conductor 232*a* of the inner middle layer and the electric conductor 232*b* of the outer middle layer are provided by a small segment 232 constituted by forming a series of the electric conductors substantially in the U-like shape. A conductor segment 230 in the U-like shape constituting a base unit is formed with the large segment 231 and the small segment 232.

The respective segments 231 and 232 are provided with portions contained at inside of the slot 25 and extended along the axial direction and slanted portions 231*f*, 231*g*, 232*f* and 232*g* as bent portions extended to incline by predetermined angles relative to the axial direction. By the slanted portions, there are formed a group of coil ends projected from the stator core 22 to the both end faces in the axial direction. Flow paths of cooling wind produced when the mixed flow fan 11 and the centrifugal fan 12 attached to both end faces in the axial direction of the rotor 3 are rotated are mainly formed among the slanted portions. Further, the flow paths of cooling wind are arranged also with lead wires of the stator winding 23.

The above construction is applied to the conductor segments 230 of all the slots 25. Further, in a group of coil ends on a nonturn portion side, an end portion 231*e'* of the outer end layer and an end portion 232*e* of the outer middle layer as well as an end portion 232*d* of the inner middle layer and an end portion 231*d'* of the inner end layer are joined respectively by means of welding, ultrasonic welding, arc welding, soldering or the like to thereby form the outer side joint portion 233*b* and the inner side joint portion 233*a* and electrically connected.

The stator winding 23 included in the stator 2 of the vehicular alternator 1 according to the embodiment is provided with a Δ-connection portion formed by using portions of the respective phase winding by cyclically connecting the middle point 23C of one phase winding and the winding finish end 23*b* of other phase winding for all the phase windings. As is well known, a line voltage generated at the Δ-connection portion becomes 1/√3 (square root of 3) times as much as a line voltage generated at the Y-connection portion. That is, the Δ-connection portion is equivalent to the Y-connection portion of a series conductor number having a multiplication factor of 1/√3.

Therefore, according to the embodiment, the series conductor number of the Δ-connection portion becomes 9.2 (=16×(1/√3)) pieces equivalently in conversion to that of the Y-connection. The Y-connection portion having the series conductor number of 48 is connected in series with the Δ-connection portion. Therefore, the series conductor number of a total of the stator winding 23, becomes 57.2 pieces equivalently in conversion to that of the Y-connection. In this way, while the number of conductors at inside of the slot 25 stays to be 4 pieces for all the slots 25, the substantial series conductor number can be changed from 64 in the case of the conventional Y-connection which is not provided with the Δ-connection portion to 57.2 (in correspondence with 3.6 turns).

Figure 8:
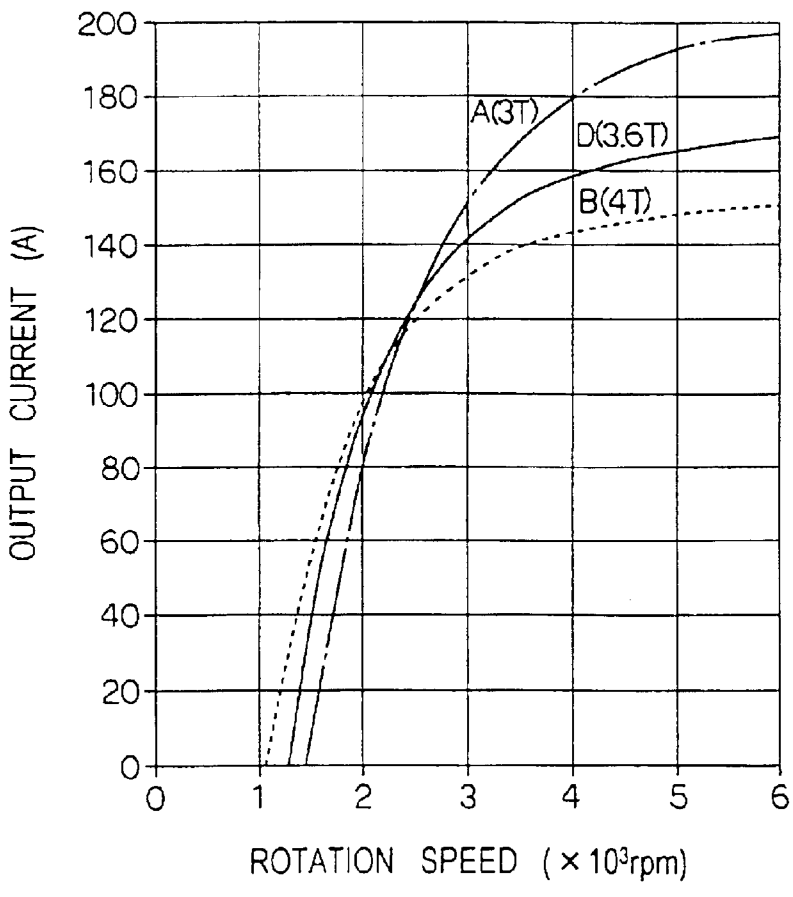
FIG. 8 is a graph showing an output characteristic of the vehicular alternator according to the embodiment.

FIG. 8 is a graph showing an output characteristic of the vehicular alternator according to the embodiment. In this figure, characteristic curves A and B show output characteristics of the conventional vehicular alternator when the number of turns of the stator winding connected by Y-connection is set to 3 and 4. Characteristic curve D shows an output characteristic of the vehicular alternator 1 according to the embodiment in correspondence with 3.6 turns. In this way, according to the vehicular alternator 1 of the embodiment, there can be provided an intermediary output characteristic for smoothing stepwise output characteristics change provided in the case of using the stator winding having number of turns of integer values as in the conventional vehicular alternator.

Further, by changing the position of the middle point 23C of the respective phase windings included in the stator winding 23, a rate of respective series conductor numbers (number of turns) of the Δ-connection portion and the Y-connection portion, can arbitrarily be changed. Therefore, the substantial series conductor number in the case of being converted into Y-connection can arbitrarily be changed. That is, the respective phase windings included in the stator winding 23 are constituted by connecting 64 pieces of the conductor segments 230 in series. Therefore, the positions of the middle points 23C can be changed in 64 ways and 64 ways of output characteristics can be provided by changing the positions of the middle points 23C. Therefore, there is remarkably promoted a degree of freedom of changing the output characteristic which can be changed only stepwisely by changing the number of turns conventionally.

Further, since the number of conductors at inside of the slot 25 is set to the same number "4", a pertinent winding occupying rate can be set for all the slots 25, even when vibration is applied from outside, the conductors at inside of the slot 25 can be prevented from being vibrated considerably and reliability of the vehicular alternator 1 can be promoted.

Further, in the case of changing the number of turns to make the output characteristic variable as in the conventional machine, normally, in order to make the occupying rate constant, a sectional area of the conductor is changed. Therefore, in accordance with the change, many kinds of wiring jigs need to be prepared. However, according to the embodiment, the output characteristic can be made variable without changing the number of pieces of the conductors at inside of the slot 25. Therefore, the stator winding 23 can be manufactured by using one kind of winding jig. Thus, a manufacturing facility can be simplified. Further, the conductor (conductor segment 230) to be prepared may only of one kind. Therefore, steps can be simplified and cost can be reduced by reducing a number of parts.

Further, according to the vehicular alternator 1 using the conductor segment 230 as in the embodiment, the shape of the coil end of the stator 2 can be aligned as shown in FIG. 6 and FIG. 7. Therefore, the winding occupying rate in the slot 25 can be promoted and a length of the coil can be shortened. Therefore, resistance of the stator winding 23 can be reduced, and high output formation and high efficiency formation can be constituted. Particularly, in the case of using the conductor segment 230, when the output characteristic is intended to change by changing the number of turns as in the conventional machine, in accordance with the change in the number of pieces of the conductor segments 230, the number of points of connecting the conductor segments 230 and the number of times of folding to bend the conductor segments 230 need to change and the output characteristic cannot substantially be changed by the same facility. However, according to the vehicular alternator 1 of the embodiment, by only changing the position of connecting the wires, the output characteristic can be changed by making the substantial series conductor number variable.

Figure 9:
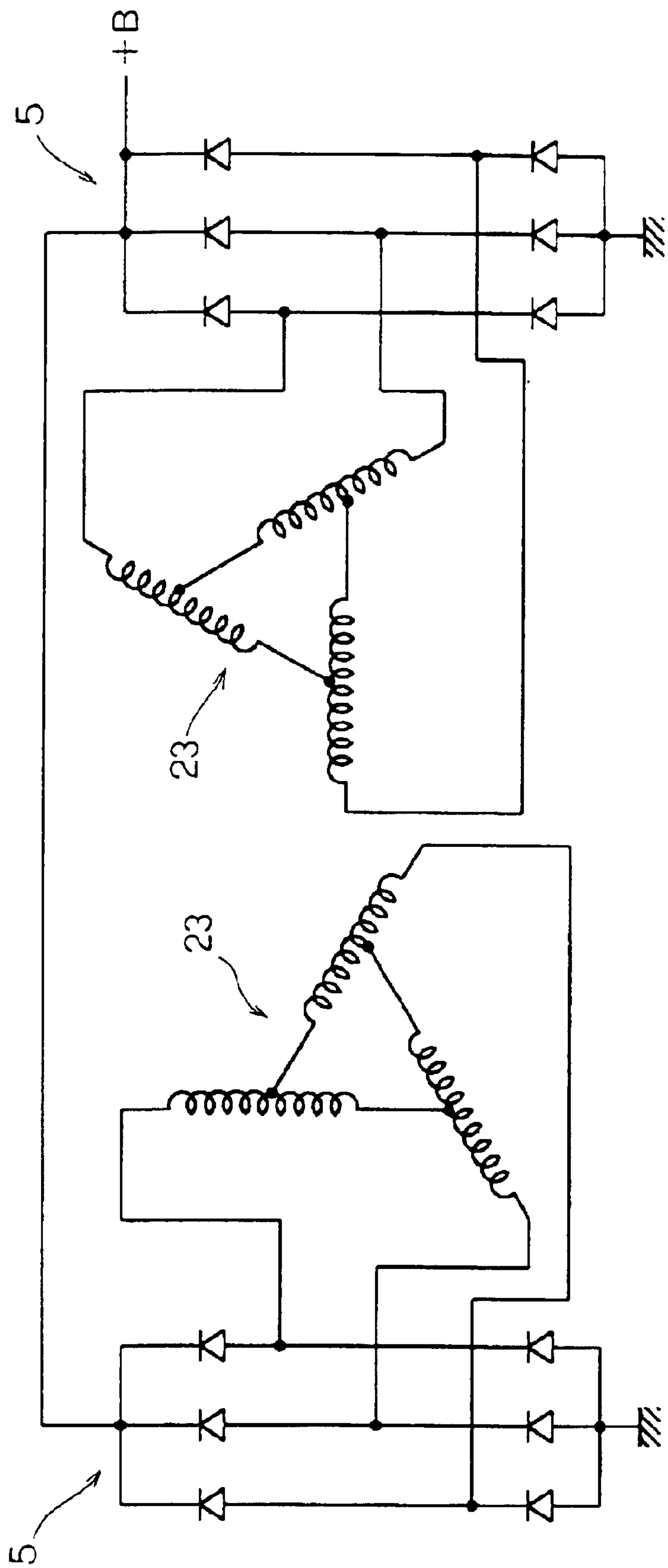
FIG. 9 is a wiring diagram showing a vehicular alternator using two sets of three-phase windings having a phase difference of $\pi/6$ in electric angle according to a modification of the embodiment.

Further, the above embodiment but can be modified in various ways. For instance, as shown in FIG. 9, the vehicular alternator 1 may be modified to have stator windings 23 comprising two sets of three-phase windings having a phase difference of $\pi/6$ in electric angle therebetween. For example, according to respectives of the two sets of three-phase windings, a rate of a series conductor number between a middle point and a winding start end of respective phase winding, to a series conductor number between the middle point and the winding finish end, and a method of connection are set to be the same. Further, lead wires extended from the respective three-phase windings are connected to separate full-wave rectifying circuits included in the rectifier device 5.

According to the vehicular alternator having such a construction, current flowing in respectives of two sets of three-phase windings is provided with a phase difference of $\pi/6$ in electric angle. Therefore, counter magnetomotive force of the respective three-phase windings is cancelled by each other and magnetic noise can be reduced. Further, since there are two sets of the three-phase windings, a manufacturing facility which is liable to be complicated can be simplified and the cost can be reduced.

Further, although according to the above-described modified example, the magnetic noise is reduced by using the two sets of three-phase windings having the phase difference of $\pi/6$ in electric angle thereamong, the magnetic noise may be reduced by constituting one set of three-phase windings by using two kinds of phase windings having a phase difference of $\pi/6$ in electric angle thereamong.

Figure 10:
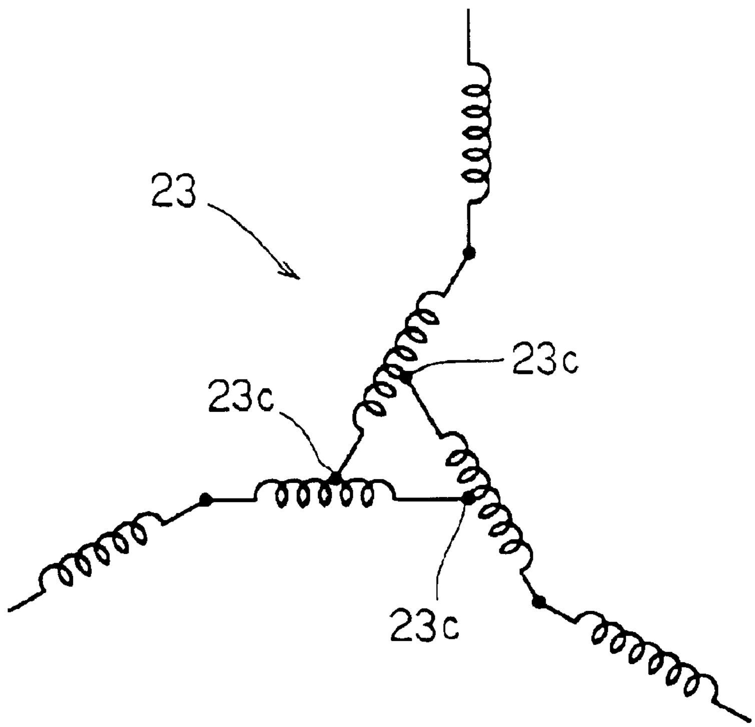
FIG. 10 is a wiring diagram showing a stator winding using two kinds of phase windings having a phase difference of $\pi/6$ in electric angle according to another modified embodiment.
Figure 11:
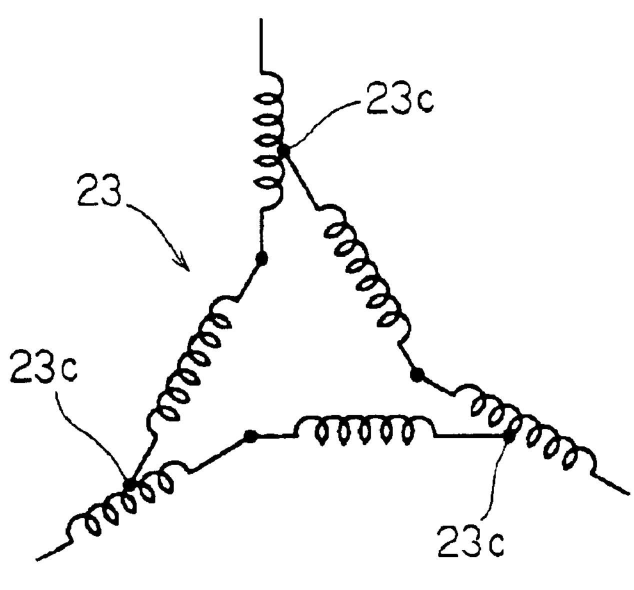
FIG. 11 is a wiring diagram showing a stator winding using two kinds of phase windings having a phase difference of $\pi/6$ in electric angle according to a further modified embodiment.
Figure 12:
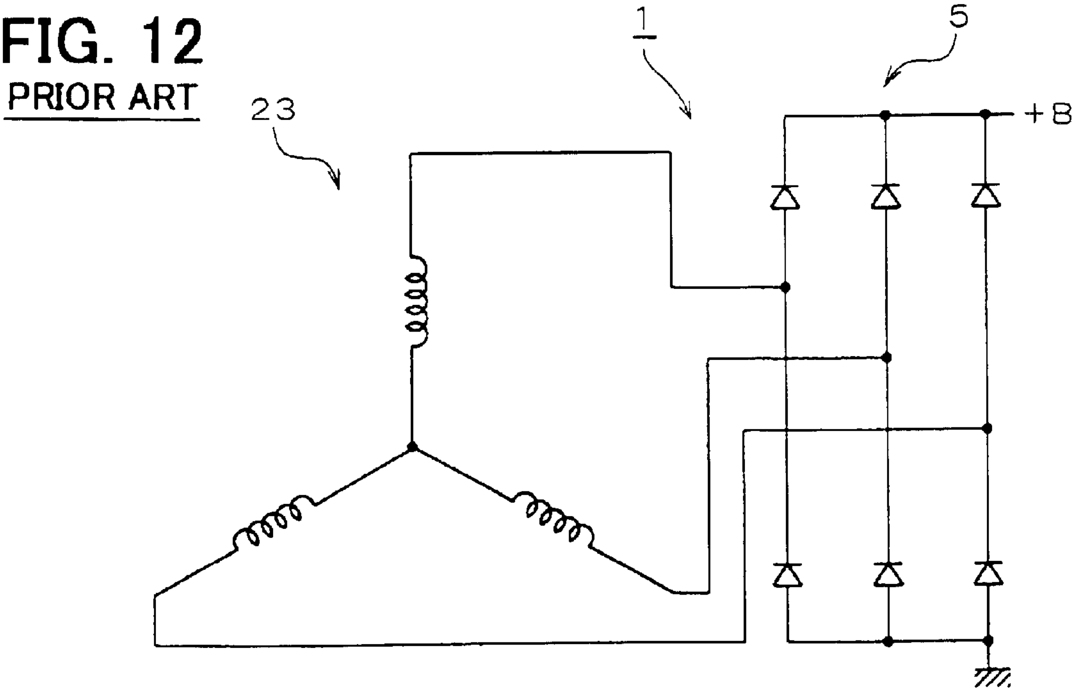
FIG. 12 is a wiring diagram showing a conventional vehicular alternator.
Figure 13:
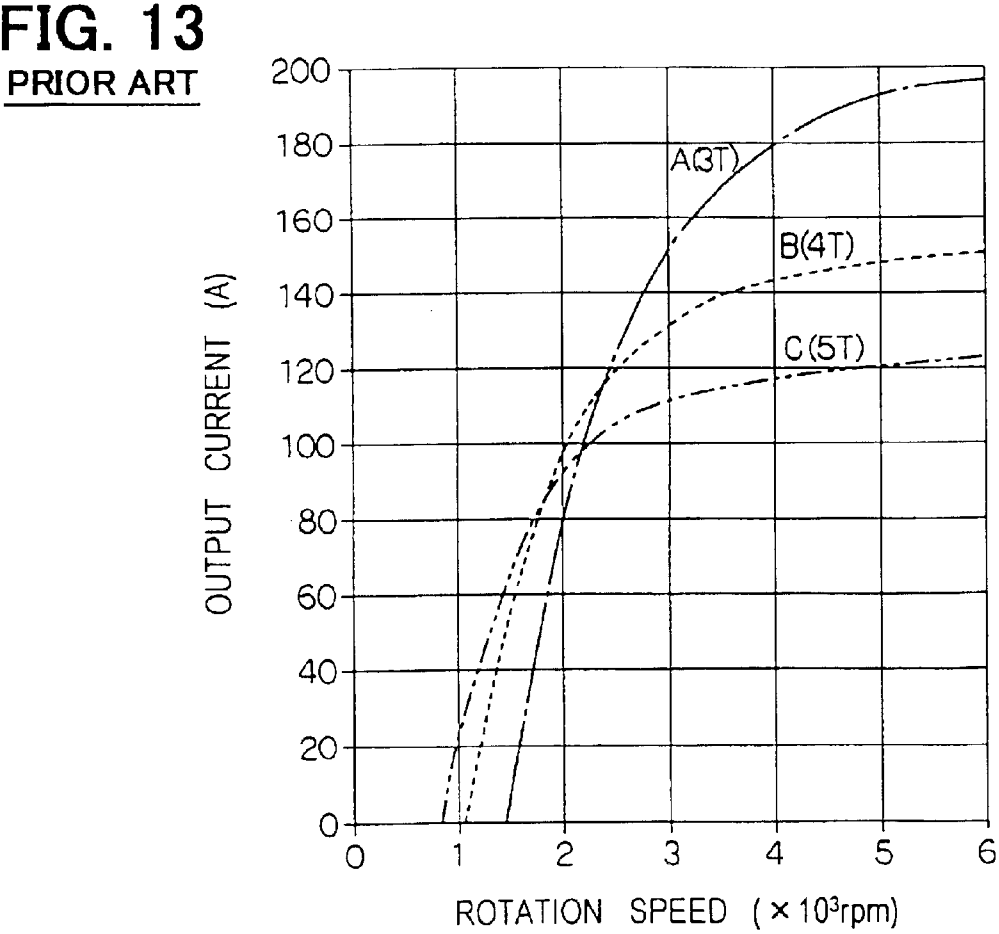
FIG. 13 is a graph showing an output characteristic of the conventional vehicular alternator.

The embodiment may further be modified as shown in FIG. 10 and FIG. 11, so that the alternator has two kinds of phase windings having a phase difference of $\pi/6$ in electric angle. In the modification of FIG. 10, the middle point 23C is set at inside of each phase winding arranged on a side opposed to the lead wire. In the modification of FIG. 11, the middle point 23C is set to inside of a phase winding arranged on a side of the lead wire. By making the position of the middle point variable, the substantial series conductor number in the case of being converted into Y-connection can be changed and the output characteristic of the vehicular alternator can be changed. Further, since there are used the two kinds of phase windings having the phase difference of $\pi/6$ in electric angle thereamong, the counter-magnetomotive force of the respective phase windings is cancelled by each other and the magnetic noise of the vehicular alternator can be reduced.

Further, the middle point of one phase winding and the winding start end of another phase winding may be connected and a side of the winding finish end may be connected to the rectifier device. The above arrangement may be applied to other types of vehicular rotary electric machines, for example, a motor.

What is claimed is:

1. A rotary electric machine, comprising:

a rectifier device for rectifying voltages induced in the multi-phase winding;

a stator core having a plurality of slots; and a multi-phase winding including a plurality of phase windings wound in the slots at predetermined angular intervals, wherein:

one end of one of the phase windings is connected to a middle point other than both ends of another one of the phase windings in a cyclic manner among the phase windings;

the multi-phase winding has a plurality of separate electric conductor segments connected in series;

each of the slots receives therein generally a same number of the conductor segments;

the electric conductor segments are connected together through respective end portions;

each of the phase windings includes a first winding and a second winding connected in series, the first winding being connected to the middle point of the another one of the first phase windings and having a middle point to which a third one of the first phase windings is connected, and the second winding being connected to the rectifier device and the second winding having no middle point which is connected to the another one and the third one of the phase windings, and only a part of the first winding of each of the phase windings provides a Δ-connection of a stator winding of an alternator, and the second winding of each of the phase windings is connected to the rectifier device to provide a Y-connection of the stator winding of the alternator.

2. The rotary electric machine according to claim 1, wherein the multi-phase winding includes two sets of three-phase windings having a phase difference of $\pi/6$ in an electric angle from each other.

3. The rotary electric machine according to claim 1, wherein the electric conductor segments each has a rectangular sectional shape.

4. The rotary electric machine according to claim 3, wherein the electric conductor segments each has a substantially same sectional shape and in different lengths in each slot.

5. The rotary electric machine, according to claim 1, further comprising:

a rectifier device for rectifying voltages induced in the multi-phase winding, wherein another end of each of the phase windings is connected to the rectifier device.

6. The rotary electric machine, according to claim 1, wherein:

a number of the electric conductor segments received in each of the slots is fixed to an integer, and at least two conductor segments in a same slot are different in lengths and joined together.

7. A rotary electric machine, comprising:

a stator core having a plurality of slots;

a multi-phase winding including a plurality of phase windings received in the slots, a number of turns of each of the phase windings in each of the slots being fixed to a first integer; and a rectifier device connected to the phase windings, wherein the phase windings are connected to one another in a predetermined form of a Y-connection and a Δ-connection to provide an output which is intermediate between first and second outputs which the rectifier device provides when the phase windings are connected in the Y-connection and the number of turns in each slot is fixed to the first integer and to a second integer having a value which is less than the first integer by one, wherein each of the phase windings is composed of a plurality of conductor segments in at least two lengths joined together in a same slot.

8. The rotary electric machine according to claim 1, wherein the conductor segments connected together are U-shaped, in different lengths and received in a same slot.

9. The rotary electric machine according to claim 1, wherein the first winding and the second winding have a phase difference of $\pi/6$ in an electric angle from each other.

10. A rotary electric machine, comprising:

a stator core having a plurality of slots;

a multi-phase winding including a plurality of phase windings wound in the slots at predetermined angular intervals, wherein:

one end of one of the phase windings is connected to a middle point other than both ends of another one of the phase windings in a cyclic manner among the phase windings;

the multi-phase winding has a plurality of separate electric conductor segments connected in series;

each of the slots receives therein generally a same number of the conductor segments;

the electric conductor segments are connected together through respective end portions; and a rectifier device for rectifying voltages induced in the multi-phase winding, wherein each of the phase windings includes a first winding and a second winding connected in series, the first winding being connected to the middle point of the another one of the second phase windings and the first winding having no middle point which is connected to the another one and the third one of the phase windings, and the second winding being connected to the rectifier device and having a middle point to which the third one of the phase windings is connected, and wherein the first winding and a part of the second winding provide a Δ-connection of a stator winding of an alternator, and the second winding of each of the phase windings is connected the rectifier device to provide a Y-connection of the stator winding of the alternator.

11. The rotary electric machine according to claim 10, wherein the first winding and the second winding have a phase difference of $\pi/6$ in an electric angle from each other.

* * * * *